United States Patent [19]

Glenn

[11] Patent Number: 4,733,299
[45] Date of Patent: Mar. 22, 1988

[54] METHOD AND APPARATUS FOR GENERATING PROGRESSIVELY SCANNED TELEVISION INFORMATION

[75] Inventor: William E. Glenn, Ft. Lauderdale, Fla.

[73] Assignee: New York Institute of Technology, Old Westbury, N.Y.

[21] Appl. No.: 30,731

[22] Filed: Mar. 26, 1987

[51] Int. Cl.⁴ ............................................... H04N 7/01
[52] U.S. Cl. ...................................... 358/140; 358/11
[58] Field of Search .................................. 358/140, 11

[56] References Cited

U.S. PATENT DOCUMENTS

| | | | |
|---|---|---|---|
| 4,517,597 | 5/1985 | Glenn | 358/141 |
| 4,616,251 | 10/1986 | Pritchard | 358/11 |
| 4,628,344 | 12/1986 | Glenn | 358/12 |
| 4,652,909 | 3/1987 | Glenn | 358/41 |
| 4,661,850 | 4/1987 | Strolle | 358/140 |
| 4,672,444 | 6/1987 | Bergen | 358/140 |
| 4,673,978 | 6/1987 | Dischert | 358/140 |
| 4,701,783 | 10/1987 | Glenn | 358/12 |

FOREIGN PATENT DOCUMENTS 53-79421  7/1978  Japan ..................................... 358/11

*Primary Examiner*—Howard W. Britton
*Attorney, Agent, or Firm*—Martin M. Novack

[57] ABSTRACT

A technique is disclosed for generating a progressively scanned video signal from an interlaced signal without the need for motion-adaptive processing. Low resolution information is obtained from the current interlaced field, and the remaining detail information is obtained from a stored signal that includes a prior field or fields. The obtained signal can then be displayed with progressive scanning at full resolution and without motion artifacts.

8 Claims, 3 Drawing Figures

METHOD AND APPARATUS FOR GENERATING PROGRESSIVELY SCANNED TELEVISION INFORMATION

BACKGROUND OF THE INVENTION

This invention relates to video signal processing and, more particularly, to an improved method and apparatus for generating a progressively scanned video signal.

In recent years, television display systems capable of displaying larger numbers of lines than standard television, for example, 1125 lines per frame as compared to 525 lines per frame for NTSC television, have become more popular. However, in order to take advantage of this enhanced ability, not only should the display device have greater resolution capability, but the signal to be presented should be in a form to take full advantage of the display device's performance.

Sometimes, a high definition video signal may be available for display. In other situations, a standard television signal (e.g. 525 lines per frame for NTSC) can be converted to a format for display with an increased number of lines per field, such as by using a line interpolation technique.

It has been recognized that using a progressive display format has certain advantages over the standard (for example NTSC) interlaced display format. Compared with an interlaced display, a progressive display eliminates interline flicker, and reduces the visibility of the field-line structure that is noticeable when a viewer makes vertical eye movements.

In systems where an interlaced video signal is converted to progressive format for display, as is done in certain high definition television systems, there has been a need to utilize motion-adaptive processing in an attempt to overcome problems inherent in the conversion. In particular, on the one hand, if information from a full frame (two successive interlaced fields) is combined in generating the progressively scanned frame, there will be motion artifacts that result from part of the information being from an "old" field. On the other hand, if only the current field information is used, the resulting image will have good motion rendition, but suffers a loss in vertical resolution, since only half the available lines are being used. A solution currently employed is to provide both types of information processing, and to also provide motion detection circuitry to control selection of which type of processing is to be used during a particular portion of the image to be displayed. In portions of the picture where there is little or no motion, information from the full frame (including the prior field) is combined, whereas when motion is detected, only information from the current field is utilized. It would be advantageous to be able to eliminate the need for motion-adaptive processing in these types of systems.

As described in my U.S. Pat. Nos. 4,517,597, 4,628,344 and 4,652,909, and in my copending U.S. patent application Ser. No. 07/005,296, now U.S. Pat. No. 4,701,783, an electronic video signal (television signal) can be encoded at reduced bandwidth by lowering the frame refresh rate of the high spatial frequency components, while maintaining the frame refresh rate of at least a portion of the low spatial frequency components at the standard rate. If done in a specified manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth. Also, as shown in the prior patents and copending application, the low spatial resolution information can be generated in a form which is compatible with standard television video, e.g. NTSC video.

It is among the objects of the present invention to provide an improved method and apparatus for generating a high definition video display in progressive scan format which utilizes signals that are in accordance with the system described in my referenced prior patents and application. It is also among the objects of the invention to provide a technique for generation of video in progressive scan format that has application to other types of high definition video systems, as well as to other video systems which would benefit from having a progressive scan format, regardless of their particular original number of lines or resolution capabilities.

SUMMARY OF THE INVENTION

Applicant has discovered that a progressively scanned video signal can be successfully obtained from an interlaced video signal without the need for motion-adaptive processing. Low resolution information is obtained from the current interlaced field, and the remaining detail information is obtained from a stored signal that includes a prior field or fields. The obtained signal can then be displayed with progressive scanning at full resolution, and without motion artifacts. Since only the detail signal is obtained from a prior field or fields, and since human vision does not as quickly perceive motion of high spatial frequencies, there will be little if any, perceived motion artifacts in the resultant displayed signal. However, the detail signal, including its components from prior a field or fields, will provide the desired resolution of the generated progressively scanned display.

In accordance with an embodiment of the method of the present invention, a technique is provided for generating a progressively scanned video signal representative of images. An interlaced relatively low spatial frequency video signal, representative of the images, is derived at a relatively fast frame refresh rate; e.g. the NTSC rate of 30 frames per second interlaced at 60 fields per second. A relatively high spatial frequency video signal, representative of the images, is derived at a relatively slow frame refresh rate; for example, 15 frames per second or less. The interlaced relatively low spatial frequency video signal is connected to an interlaced relatively low spatial frequency signal having an increased number of lines, the information for each converted field coming from a field of the original interlaced relatively low spatial frequency video signal. The relatively high spatial frequency signal is converted to a relatively high spatial frequency signal having said relatively fast frame refresh rate, each field of the converted relatively high spatial frequency signal containing information from more than a single field of the original relatively high spatial frequency video signal. The converted low and high spatial frequency video signals are combined to obtain the progressively scanned video signal.

The invention can be utilized in the context of a high definition television system, or can be utilized in the context of a standard resolution television system; the conversion to progressive scan in either type of system having certain performance advantages.

Further features and advantages of the invention will become more readily apparent from the following detailed description when taken in conjunction with the accompanying drawings.

DESCRIPTION OF THE PREFERRED EMBODIMENT

Figure 1:
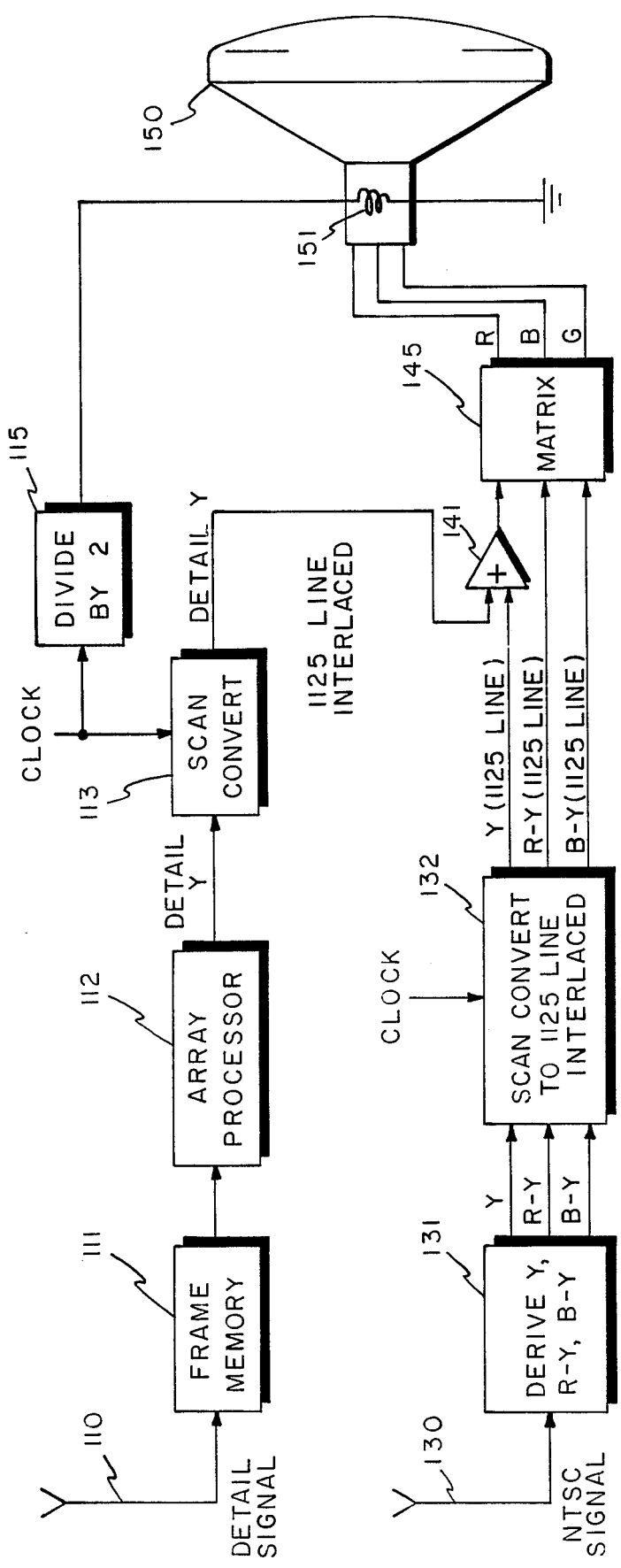
FIG. 1 is a block diagram of an apparatus in accordance with the invention, and which can be used to practice the method of the invention.

Referring to FIG. 1, there is shown a block diagram of an apparatus in accordance with an embodiment of the invention, and which can be used to practice the method of the invention. In the illustrated embodiment, it is assumed that a conventional resolution signal (e.g. an NTSC signal), and a detail signal, which contains high spatial frequency components of a television picture and which can be combined, after suitable processing, with the conventional resolution signal to obtain a high definition television signal, are derived by receiving transmitted versions of the respective signals. However, it will be understood that the signals can be derived from any other suitable source, for example, a video recorder having high definition capability. As described in my above referenced patents, the detail signal can be transmitted and/or stored at reduced bandwidth by lowering its frame refresh rate, for example to a rate of 15 or 7.5 frames per second (as compared to 30 frames per second for conventional NTSC television signals). This does not cause substantial degradation in the ultimately displayed image, since human vision cannot perceive changes in high spatial resolution information at as fast a rate as it can perceive changes in low spatial frequency information.

In describing some of the processing in the circuitry of FIG. 1, it will be understood that features previously set forth in my above referenced patents and application, which are incorporated herein by reference, or which involve well-known television processing techniques, will be described only to the extent necessary to understand the present invention. The detail signal is stored in a frame memory 111 which is operative, as described in my above referenced patents and application, in conjunction with the array processor 112 and the scan converter 113, to receive and store the detail information at its reduced frame refresh rate, and to produce output detail information at a higher frame refresh rate, typically 30 frames per second. This is done by suitably combining information from a number of successive frames and applying spatial filtering in the horizontal and vertical directions. The result is a detail signal having, for example, 1125 interlaced lines, at a frame period of 1/30 second (and field period of 1/60 second) which contains picture information that includes contributions from the original image taken over a much longer time period, for example a 1/7.5 second period. The output of scan converter 113 becomes part of a signal that is presented in a so-called spot wobble mode, to obtain an effective 60 frame per second progressive scan. A high resolution display device 150 may be, for example, a standard type of 1125 line interlaced monitor, but equipped with a small deflection coil 151 that operates to wobble the spot vertically by one line width at a frequency of half the horizontal clock frequency of the detail signal. A divide-by-two circuit 115 operates on the horizontal clock signal (which can also be related to the clock used in the scan conversion of the NTSC signal components) to obtain the control clock for the spot wobble.

Figure 2:
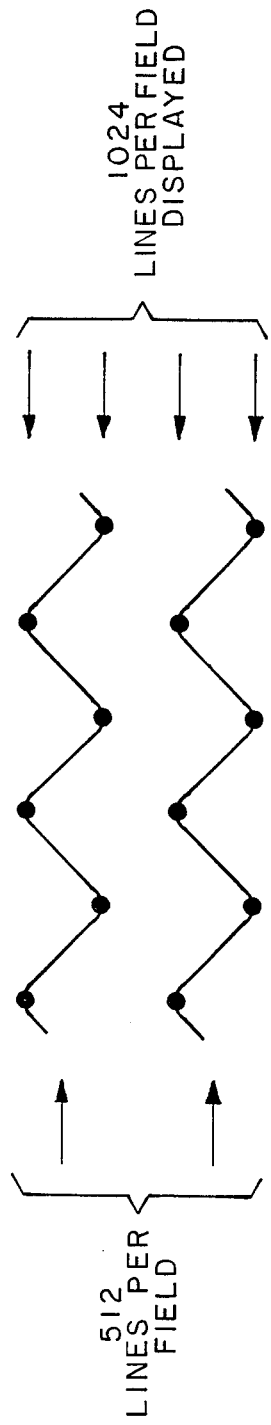
FIG. 2 is a diagram which illustrates the type of display obtained using spot wobble.

The use of spot wobble for various purposes is well known in the art, and different methods of implementation can be employed. Also, as noted below, the invention can be implemented without using spot wobble. FIG. 2 illustrates how two lines can be clocked out during one scan, it being assumed that there are 1,024 displayed lines per field, as obtained from the original 512 displayed lines per field of the original interlaced 1125 total line detail signal. As seen, successive pixels to be presented are taken in alternating fashion from adjacent lines, and presented using spot wobble, at twice the pixel clock rate.

The NTSC signal is received and processed by conventional means to obtain a luminance signal Y and color difference signals R-Y and B-Y (block 131). A scan converter 132 is then utilized to convert the Y, R-Y and B-Y signals to 1125 line interlaced format. This can be implemented, as is known in the art, by line interpolation during each field. Accordingly, for example, each output field (Y, R-Y, B-Y) of the scan converter has 512 lines to be ultimately displayed. The scan converted luminance signals output from converters 113 and 132 are coupled to an adder 141, the output of which is coupled to the Y input of a matrix 145. The other two inputs to matrix 145 are the R-Y and B-Y signals output from scan converter 132. The outputs of matrix 145 are R, B, G signals that are coupled to the inputs of the color television display device 150.

In operation, the spot wobble is at a clock rate that will cause the diagonally sampled detail signal to have successive elements be presented in alternating fashion between two adjacent lines (see e.g. FIG. 2). However, the spot wobble clock has a period that is shorter than a resolution element of the low spatial frequency (NTSC derived) signal, so this part of the signal applied to the display device will be just spread between adjacent lines as a result of the spot wobble.

It will be understood that the described technique and system could be implemented without spot wobble, such as by scan-converting both the detail and the current field of the 525 line information to 1125 line 60 frame format, and then adding them together.

Figure 3:
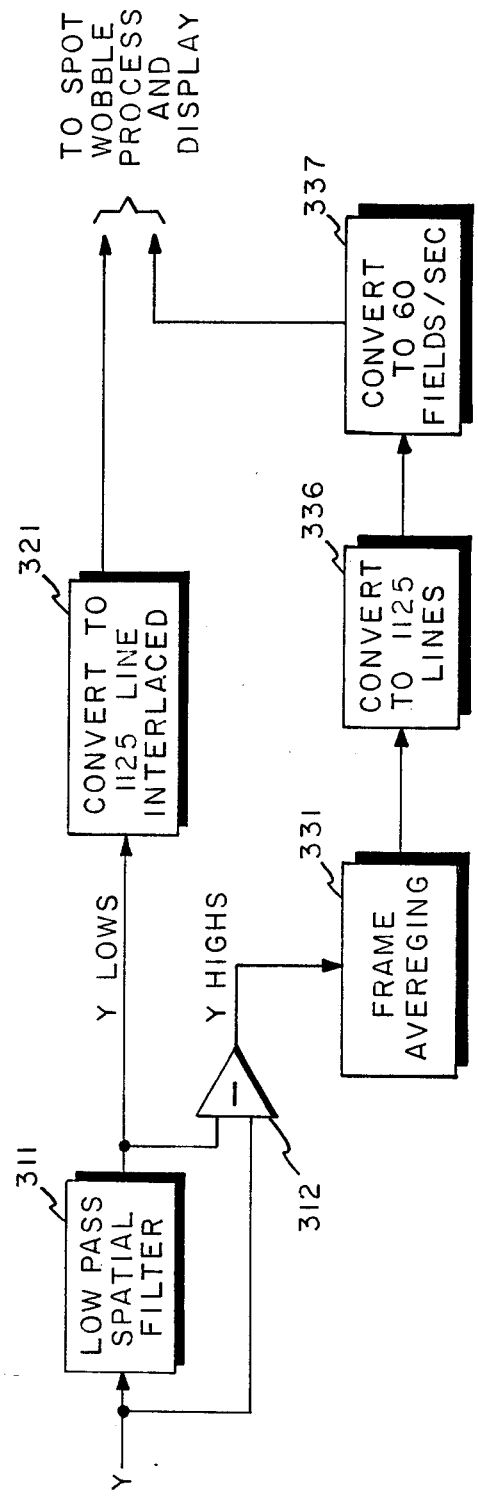
FIG. 3 is a block diagram of a further embodiment of the invention.

The invention also has application, for example, to scan conversion of a conventional interlaced signal, such as NTSC, to progressive format at either the same number of lines per frame or at increased number. An illustration is set forth in the diagram of FIG. 3. The luminance Y of an NTSC signal is separated, using low pass spatial filter 311 and subtractor 312 (and suitable delay equalization not shown, which will be understood to be present, where required) into a low frequency Y and a detail Y. In this case, the Y lows are converted to 1125 line interlaced (block 321). The detail Y is averaged (e.g. integrated) over a suitable number of fields or frames (block 331) and, in this case, is also converted to 1125 line interlaced format, and back to 30 interlaced frames per second (blocks 336 and 337). The two signals can then be displayed using the spot wobble scheme of FIG. 1. Alternatively, as previously noted, the Y lows and detail Y can both be converted to progressive format and combined without the need for spot wobble.

The invention has been described with reference to particular preferred embodiments, but variations within the spirit and scope of the invention will occur to those skilled in the art. For example, the invention has application to both monochrome and color video signals and, also, the special processing of color signals, consistent with the way different colors are perceived by human vision (as set forth in my prior patents and application), can be advantageously employed.

I claim:

1. A method for generating a progressively scanned video signal representative of images, comprising the steps of:
    deriving an interlaced relatively low spatial frequency video signal representative of said images, at a relatively fast frame refresh rate;
    deriving a relatively high spatial frequency video signal representative of said images, at a relatively slow frame refresh rate;
    converting said interlaced relatively low spatial frequency video signal to an interlaced relatively low spatial frequency video signal having an increased number of lines, the information for each converted field coming from a field of the original interlaced relatively low spatial frequency video signal;
    converting said relatively high spatial frequency signal to a relatively high spatial frequency signal having said relatively fast frame refresh rate, each field of said converted relatively high spatial frequency signal containing information from more than a single field of the original relatively high spatial frequency video signal; and
    combining the converted relatively low spatial frequency video signal and the converted relatively high spatial frequency video signal to obtain said progressively scanned video signal.

2. The method as defined by claim 1 wherein said derived interlaced relatively low spatial resolution signal is at a frame rate of 30 frames per second and a field rate of 60 fields per second.

3. The method as defined by claim 2 wherein said derived relatively high spatial resolution signal is at a frame rate of 15 frames per second or less.

4. The method as defined by claim 1 wherein each field of converted relatively high spatial frequency signal contains information from at least two fields of the original relatively high spatial frequency video signal.

5. The method as defined by claim 4 wherein said converting of said interlaced relatively low spatial frequency information includes generating additional lines of a video field between existing lines, based on the information in said existing lines.

6. The method as defined by claim 4 wherein said converted high and low spatial frequency signals have about the same number of lines, and wherein said converted high and low spatial frequency signals are combined and applied to a display device, with spot wobble.

7. Apparatus for generating a progressively scanned video signal representative of images, comprising:
    means for deriving an interlaced relatively low spatial frequency video signal, representative of said images, at a relatively fast frame refresh rate;
    means for deriving a relatively high spatial frequency video signal, representative of said images, at a relatively slow frame refresh rate;
    means for converting said interlaced relatively low spatial frequency video signal to an interlaced relatively low spatial frequency video signal having an increased number of lines, the information for each converted field coming from a field of the original interlaced relatively low spatial frequency video signal;
    means for converting said relatively high spatial frequency signal to a relatively high spatial frequency signal having said relatively fast frame refresh rate, each field of said converted relatively high spatial frequency signal containing information from more than a single field of the original relatively high spatial frequency video signal; and
    means for combining the converted relatively low spatial frequency video signal and the converted relatively high spatial frequency video signal to obtain said progressively scanned video signal.

8. A method for converting an interlaced video signal to progressive format, comprising the steps of:
    separating said signal into high and low spatial frequency signals;
    combining video information from at least two fields of the high spatial frequency signals, and producing therefrom, a converted high spatial frequency signal at the field rate of the original interlaced video signal;
    converting the low spatial frequency signal to a signal having an increased number of lines, the information for each converted field coming from a field of the original separated low spatial frequency signal; and
    combining the converted high and low spatial frequency signals to obtain a signal for progressive display.

* * * * *